(12) United States Patent
Ryan et al.

(10) Patent No.: US 11,735,054 B1
(45) Date of Patent: Aug. 22, 2023

(54) SMARTPHONE MARINE VESSEL LOCATION AND COLLISION AVOIDANCE SYSTEM AND METHODS OF USE

(71) Applicants: Robert Ryan, Mattapoisett, MA (US); Stephen Hayes, Franklin, MA (US); Robert E. Pantano, Franklin, MA (US)

(72) Inventors: Robert Ryan, Mattapoisett, MA (US); Stephen Hayes, Franklin, MA (US); Robert E. Pantano, Franklin, MA (US)

(*) Notice: Subject to any disclaimer, the term of this patent is extended or adjusted under 35 U.S.C. 154(b) by 320 days.

(21) Appl. No.: 17/023,896

(22) Filed: Sep. 17, 2020

Related U.S. Application Data

(60) Provisional application No. 62/901,658, filed on Sep. 17, 2019.

(51) Int. Cl.
| | |
|---|---|
| *G08G 3/02* | (2006.01) |
| *B63B 43/18* | (2006.01) |
| *B63B 49/00* | (2006.01) |
| *H04W 4/40* | (2018.01) |

(52) U.S. Cl.
CPC ............... *G08G 3/02* (2013.01); *B63B 43/18* (2013.01); *B63B 49/00* (2013.01); *H04W 4/40* (2018.02); *B63B 2201/02* (2013.01); *B63B 2203/02* (2013.01); *B63B 2213/02* (2013.01)

(58) Field of Classification Search
CPC .......... G08G 3/02; B63B 43/18; B63B 49/00; H04W 4/40; B63B 2201/02; B63B 2203/02; B63B 2213/02
See application file for complete search history.

(56) References Cited

U.S. PATENT DOCUMENTS

| | | | |
|---|---|---|---|
| 4,313,115 A | 1/1982 | O'Sullivan | |
| 5,210,534 A | 5/1993 | Janex | |
| 5,381,338 A | 1/1995 | Wysocki et al. | |
| 5,696,403 A * | 12/1997 | Rostoker et al. | .. H01L 23/5222 257/532 |
| 6,048,248 A | 4/2000 | Ritchey | |
| 6,373,447 B1 * | 4/2002 | Rostoker et al. | G06K 19/07779 257/491 |
| 7,710,309 B2 * | 5/2010 | Kao et al. | ............ G01S 7/021 342/41 |
| 7,840,355 B2 | 11/2010 | Breed et al. | |
| 7,899,621 B2 | 3/2011 | Breed et al. | |
| 9,925,940 B1 * | 3/2018 | Christensen et al. | .. B60Q 5/006 |

(Continued)

FOREIGN PATENT DOCUMENTS

| | | | |
|---|---|---|---|
| KR | 101343816 B1 * | 12/2013 | ................. G01S 19/14 |
| WO | 2016027048 A1 * | 2/2016 | ................. G08G 1/164 |

*Primary Examiner* — Fekadeselassie Girma
(74) *Attorney, Agent, or Firm* — Invention To Patent Services; Alex Hobson

(57) ABSTRACT

A smartphone marine vessel location system utilizes global positioning to determine the location and trajectory of marine vessels. When two marine vessels have a trajectory that will bring the vessels within a warning zone a trajectory alert is activated and when the two vessels enter into a warning zone, a collision warning is activated. An App on the smartphones may produce a display showing the location of the marine vessels and may produce the alerts when required. The smartphone may also communicate with other navigational system on the marine vessel to produce a display and alerts, such as through Bluetooth. The location of marine vessels may be acquired through the App, through a crowd-sourcing application, and/or through a carrier sourced location.

19 Claims, 3 Drawing Sheets

(56) References Cited

U.S. PATENT DOCUMENTS

| | | | |
|---|---|---|---|
| 9,934,625 B1* | 4/2018 | Wahba et al. | G07C 5/008 |
| 10,019,006 B2 | 7/2018 | Shah et al. | |
| 11,461,457 B2* | 10/2022 | Dwarakanath et al. | ................... |
| | | | G06V 10/764 |
| 2005/0037730 A1* | 2/2005 | Montague | B60R 25/102 |
| | | | 455/456.1 |
| 2006/0038688 A1* | 2/2006 | Nakamura | G06Q 10/063 |
| | | | 340/522 |
| 2016/0125739 A1 | 5/2016 | Stewart et al. | |
| 2017/0053461 A1* | 2/2017 | Pal et al. | G07C 5/008 |
| 2020/0219336 A1* | 7/2020 | Huffman et al. | G08G 1/0129 |
| 2021/0295441 A1* | 9/2021 | Mullen et al. | G08G 1/04 |
| 2022/0076037 A1* | 3/2022 | Hochman et al. | G06F 18/25 |
| 2022/0219682 A1* | 7/2022 | Ollis | B60W 30/18163 |

\* cited by examiner

SMARTPHONE MARINE VESSEL LOCATION AND COLLISION AVOIDANCE SYSTEM AND METHODS OF USE

CROSS REFERENCE TO RELATED APPLICATIONS

This application claims the benefit of priority to U.S. Provisional Pat. No. 62/901,658, filed on Sep. 17, 2019; the entirety of which is hereby incorporated by reference herein.

BACKGROUND OF THE INVENTION

Field of the Invention

The invention relates to a smartphone marine vessel location system that produces alerts or warning to prevent collision of marine vessels.

Background

Marine vessels, and especially recreational marine vessels rely on visual detection of other marine vessels to avoid collision. The waterways are becoming more and more congested making it difficult to navigate around all the other vessels. In addition, weather can change quickly on the water and dramatically reduce visibility which can make it difficult if not impossible to safely navigate to avoid other marine vessels.

SUMMARY OF THE INVENTION

The invention is directed to a smartphone marine vessel location system that can provide an alerts and warnings to avoid collision between marine vessels. An exemplary smartphone marine vessel location system utilizes the global positioning system (GPS) of a smartphone on a marine vessel to track the location and determine a trajectory of said marine vessel. The location of a marine vessel may be accurate within about 4.9 m (16 ft) radius under open sky using the GPS system of a smartphone. An exemplary smartphone marine vessel location system may include an App, or application software, that provides a display of the location of the marine vessel and other marine vessels. The App may also track and monitor direction and speed, or trajectory of movement of the vessels. The App may provide a trajectory alert when two vessels have a trajectory that will bring them within warning zone distance of each other, such as within about 500 ft, within about 300 ft, within about 200 ft, within about 100 ft, within about 50 ft and any range between and including the distances provided. An initial trajectory alert may be provided when the vessels have a trajectory to bring them within a warning zone distance and a collision warning may be provided when the vessels move within a warning zone distance. The app may automatically track the location of a marine vessel when the smartphone owner boards a marine vessel, as determined by GPS and speed. When a person boards an aircraft, the speed of the aircraft may be above an upper threshold speed for marine craft and therefore their location may not be included in the system monitoring. When a user downloads the App, they may have to provide authorization for the App to monitor their location using the GPS function of the smartphone, regardless of the App being open by the user.

An exemplary smartphone marine vessel location system may utilize cellular communication between smart phones to enable tracking, monitoring and warning of collisions. Cellular communication may include the use of cellular towers and/or satellite communication and signal transmission.

An exemplary smartphone marine vessel location system utilizes smartphones on the marine vessels to track the location of the marine vessels. Smartphones on the marine vessels utilize GPS to provide updated location information to the smartphone marine vessel location system. Smartphones on the marine vessels receive location information from the smartphone marine vessel location system through GPS or GLONASS. Note that smartphone to smartphone communication may be through cellular service. An exemplary smartphone marine vessel location system may include a display showing the location of the marine vessel and the location of nearby marine vessels. An exemplary smartphone marine vessel location system may provide a trajectory alert or collision warning when the location and direction of travel of two or more marine vessels may result in a collision of the marine vessels. An exemplary smartphone marine vessel location system may interface with chartplotters or other onboard navigational systems to provide location information of the marine vessel and other marine vessels in the arear. The smartphone may communicate with the onboard navigational systems through conventional means, wired connection, or wireless communication, such as Bluetooth communication, through an onboard server and the like. The onboard navigational systems may require the user to synch their smartphone with the onboard navigational systems.

The location of the user's marine vessel and other marine vessels may be determined through the GPS on each of the phones and through the App. In some cases, location and tracking by the system may require that all vessels have a user registered with the App. However, smartphone locations may be monitored by the wireless service provider and the smartphone marine vessel location system may utilize this information without requiring each person to have the App downloaded on their smartphone. Locations of marine vessels may be determined through Crowdsourced information and/or by carrier sources location information. The location of a marine vessel may be determined if anyone on the marine vessel has a smartphone and has enable GPS location.

Today cellular services reach well into coastal waters which is where most of the recreational marine traffic and marine congestion exist. Marine services can be created using location information attained over the cellular network from smartphones on vessels. Position, direction and speed of marine vessels can be determined from this information. Over time cellular services reach will extend even further into lakes, seas and oceans. It is not unreasonable to expect to have total global cellular coverage in the future. Location information can be captured via a Crowdsouced application or directly from cellular carriers.

The marine vessel location system and collision avoidance system may identify the number of smartphones that are within a proximity distance to each other and moving in the same trajectory as being on a single marine vessel. The marine vessel location system and collision avoidance system may then use the number of smartphones identified on a vessel for the display icon shape or size or color. In an exemplary embodiment, the icon size is increased when the number of smartphones identified as being on a single vessel is above a threshold number, such as more than two, more than five, more than 10, more than 100 and the like. A cruise ship may have hundreds of identified smartphones onboard, a sail boat or motor boat may only have 10 or less identified smartphones onboard, a personal watercraft, such as a kayak or small sailboat may have one or two smartphones identified thereon. The marine vessel location system and collision avoidance system may have a small, medium and large icon to identify relative size of the marine vessels on the display.

Applications

Crowdsourced Application: A custom application can be developed that runs on smartphones and shares real-time information with other smartphones running the application. Information such as type, size, name and location of vessel can be shared. The direction of travel and speed of the vessel can be calculated using this data collected over time. This data can be use in a number of ways as an aid to marine navigation, marine congestion management, collision warning, detection and rescue. The data collected with this application can be communicated to Chartplotters using industry standard digital interfaces for navigation equipment. Chartplotters can overlay this data on top of navigation charts showing the vessel name, position, direction and speed of all vessels in the area.

Carrier Sourced Location Information Application: A custom application can be developed in collaboration with cellular carriers to share location information of all smartphones. The application can determine if the smartphones are on water and if so will assume that it is on a vessel and will capture its location information. The direction of travel and speed of the vessel can be calculated using this location information collected over time. This data can be use in a number of ways as an aid to marine navigation, marine congestion management, collision warning, detection and rescue. The data collected with this application will be communicated to Chartplotters using industry standard digital interfaces for navigation equipment. Chartplotters will overlay this data on top of navigation charts showing the position, direction and speed of all vessels in the area.

This information is particularly useful for the vessel's navigator in planning and following a route. It will be extremely useful in poor weather conditions where visibility is limited and complimentary to radar and/or Automatic Identification System (AIS) systems. AIS is a tracking system that uses transponders on vessels. These transponders are extremely expensive and are rarely used in recreational vessels. AIS is mostly used in commercial shipping. Using smartphone location services as described above is a much more cost-effective system that can used by recreational boaters as well a commercial shipping.

A collision warning system can be built using the collected location information data of other ships to automatically notify a vessel's operator of a nearby vessel. This warning system will be extremely useful in poor weather conditions where visibility is poor.

https://www.gps.gov/systems/gps/performance/accuracy/

GPS-enabled smartphones are typically accurate to within a 4.9 m (16 ft.) radius under open sky.

The government provides the PGS signal in space with a global average user range error (URRE) of ≤0.006 m/sec over any 3-second interval, with 95% probability.

https://www.gps.gov/applications/roads/

GPS enables automatic vehicle location and in-vehicle navigation systems that are widely used throughout the world today. By combining GPS position technology with systems that can display geographic information or with systems that can automatically transmit data to display screens or computers, a new dimension in surface transportation is realized.

Location Information is found using Global Navigation Satellite Systems such as GPS and GLONASS.

Crowdsourced information is the practice of obtaining information (data) by enlisting the services of a large number of people, either paid or unpaid, typically via the Internet.

Definitions

A marine vessel, as used herein, is any watercraft including but not limited to, a ship, a barge, a recreational boat including a motor boat, sailboat, jet-ski, kayak, canoe and the like.

A smartphone, as used herein is a personal electronic device that has cellular service and cellular interfacing and is used for communication with others smartphones through phone calls, and also has GPS. A smartphone may be portable in size such as mobile telephone or tablet computer. A smartphone may be a mobile telephone that has a size, length, width, or thickness, of no more than about about 250 mm or no more than 200 mm. A mobile telephone may have a phone number associated with it for receiving phone calls.

A Chartplotter is a device used in marine navigation that integrates Global Navigation Satellite System (GPS and GLONASS) location data with Electronic Navigational Charts (ENC) to show the position of a ship on a chart.

The International Electrotechnical Commission (IEC) has created a new standards suite for "Digital interfaces for navigational equipment within a ship". This is known as IEC 61162 and included NMEA 0183, NMEA 2000 and LWE.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
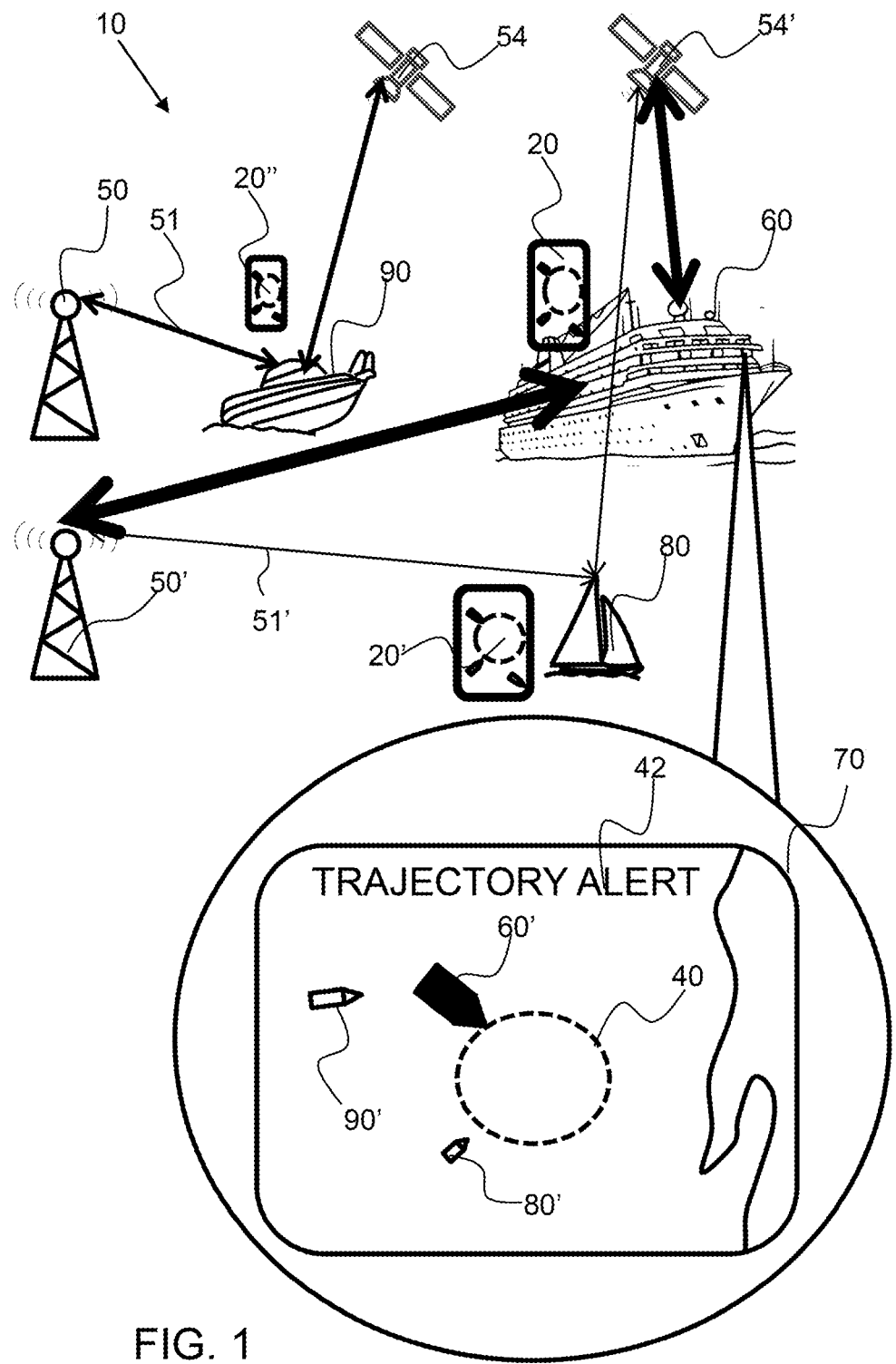
FIG. 1 shows a diagram of an exemplary smartphone marine vessel location and collision avoidance system.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

As shown in FIG. 1, the exemplary smartphone marine vessel location system and collision avoidance system 10 utilizes smartphones, 20, 20' and 20" on the marine vessels 60, 80, and 90, respectively, to track the location and trajectory of the marine vessels. Smartphones on the marine vessels utilize GPS to provide updated location information to the smartphone marine vessel location system. Smartphones on the marine vessels receive location information from the smartphone marine vessel location system through GPS or GLONASS. Note that smartphone to smartphone communication may be through cellular service. An exemplary smartphone marine vessel location system may include a display showing the location of the marine vessel and the location of nearby marine vessels. As shown, the largest marine vessel 60, a cruise ship, has a chartplotter 70 that receives information from a smartphone on board, such as the Captain's or a dedicated smartphone for this purpose. The chartplotter shows the location of the first marine vessel 60 as well as the second marine vessel 80 and a third marine vessel 90. The third marine vessel 90 is moving behind the first marine vessel and therefore is not a potential collision hazard. The second marine vessel however, a small sailboat has a trajectory into the warning zone 40, and therefore a trajectory alert 42 is initiated. The chartplotter display shows the size of the marine vessels as a function of the number of smartphones identified as being onboard. The large cruise ship may have more than 10 smartphones identified by the system as being onboard and therefore is shown as a larger icon on the display. The recreational motor boat is shown as a medium sized icon as it may have less than 10 identified smartphones onboard and the small sailboat may be the smallest icon as it has two or less identified smartphones onboard. The communication signals shown have a weight to indicate the number of identified smartphones onboard as well. As shown, the smartphones may communicate with cell towers 50, 50' or through satellites 54, 54'. Also note that smartphones with different carriers may provide input to the system, wherein the smartphone 20" on the third marine vessel 90 communicates through a wireless signal 51 with the first cell tower and the smartphone 20' on the second marine vessel 80 communicates through a wireless signal 51' a second cell tower 50'. The App may receive input from a plurality of cell towers and/or satellites. The App may function through a database and receive all the location information and send out communications to the smartphones with the App installed.

The smartphone may have a chartplotter program, such as an App or other program for producing navigational displays and the smartphone marine vessel location system and collision avoidance system may interface with this chartplotter program to display the vessels on this chartplotter display. The two programs or Apps may be integrated to show navigational aids and also vessels on a single display on the smartphone. A navigational display may include waterway locations, land masses, navigational aids, water depths which may be used to determine routes.

Figure 2:
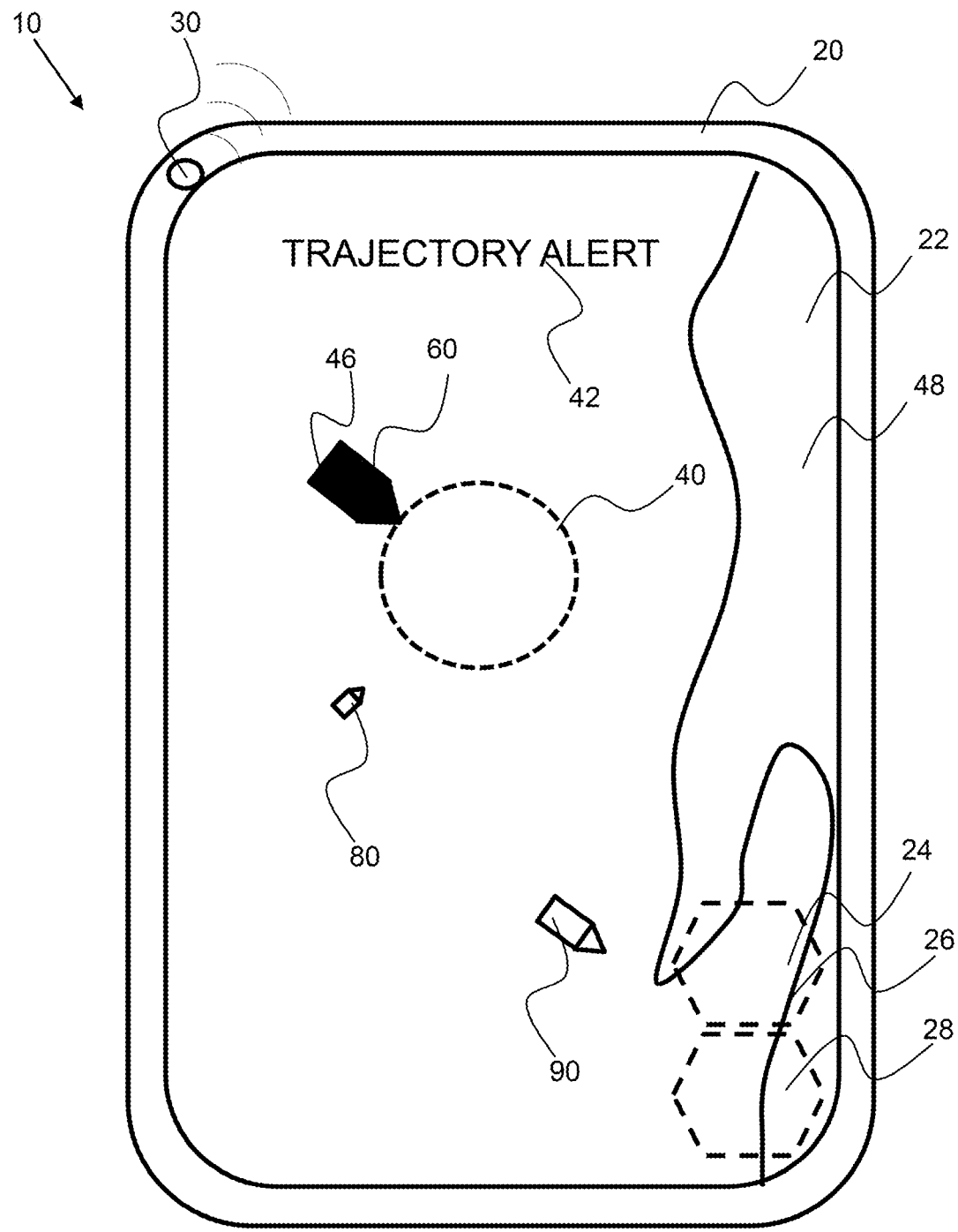
FIG. 2 shows an exemplary display on a smartphone having the location display showing the location of the user's or first marine vessel and the location of a second marine vessel, and a trajectory alert.
Figure 3:
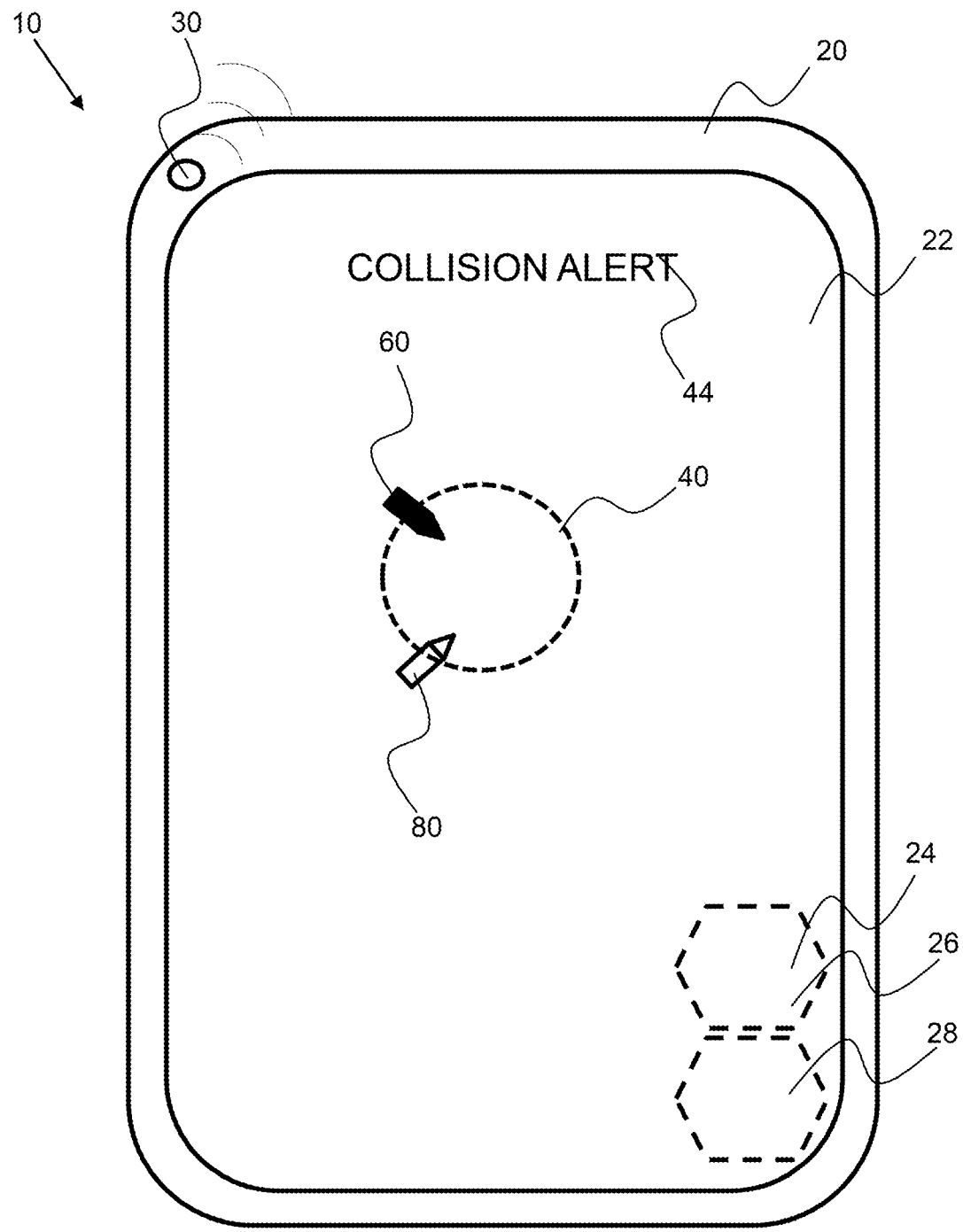
FIG. 3 shows an exemplary display on a smartphone having the location of the user's marine vessel and the location of a second marine vessel, and a collision warning.

Referring now to FIGS. 2 and 3, a smartphone marine vessel location system 10 produces a display 22, such as on a smartphone 20 that has the location of the user's marine vessel, or a first marine vessel 60 and the location of a second marine vessel 80 and third marine vessel 90. The display may show marine vessel icons 46 for the user's marine vessel and icons for the other marine vessels as well as land mass icons 48. The icons may be different colors, size or design to allow the user to quickly identify their marine vessel from other marine vessels. As shown the user's icon is black and the other marine vessels are white. The warning zone 40 is also displayed on the display. As shown in FIG. 2, the trajectory of the user's marine vessel and the trajectory of the second marine vessel will bring the two vessels within the warning zone 40. Therefore, a trajectory alert 42 has been activated, such as a display, or a sound emitted by the speaker 30. As shown in FIG. 3, the user's vessel 60 and the second marine vessel 80 have entered into a warning zone 40 and a collision warning 44 has been activated. The smartphone has a marine vessel location system and collision avoidance system App 26, a processor 28 and a GPS 24 to enable the function of the system. A smartphone has a wireless signal transceiver for communication with cellular devices, such as towers, or wi-fi from a server, such as in the home, Bluetooth, or satellites.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:
1. A smartphone marine vessel location and collision avoidance system comprising:
   a) a first marine vessel;
   b) a second marine vessel;
   c) a first smartphone located on said first marine vessel of a first user comprising:
      i) a global positioning system;
      ii) a signal transceiver for sending and receiving signals;
   d) a second smartphone located on the second marine vessel of a second user comprising:
      i) a global positioning system;
      ii) a signal transceiver for sending and receiving signals;
   wherein the first smartphone receives location information regarding the second marine vessel and wherein the first smartphone activates an alert when the second marine vessel is within a warning zone distance from first marine vessel and;

wherein a size of the second marine vessel is determined by the system by the number of smartphones identified as being located on the second marine vessel.

2. The smartphone marine vessel location and collision avoidance system of claim 1, wherein the trajectory of the first marine vessel is determined through the global positioning system and wherein a trajectory alert is initiated when the trajectory of the first marine vessel will bring the first marine vessel within a waring zone distance from the second marine vessel.

3. The smartphone marine vessel location and collision avoidance system of claim 1, wherein the trajectory of the second marine vessel is determined through the global positioning system and wherein a trajectory alert is initiated when the trajectory of the second marine vessel will bring the second marine vessel within a waring zone distance from the first marine vessel.

4. The smartphone marine vessel location and collision avoidance system of claim 1, wherein the first and second smartphones comprises an application software (App) that determines the first marine vessel location.

5. The smartphone marine vessel location and collision avoidance system of claim 1, wherein the first smartphone comprises a location display of the first marine vessel and the second marine vessel.

6. The smartphone marine vessel location and collision avoidance system of claim 5, wherein a warning zone is displayed on the location display.

7. The smartphone marine vessel location system of claim 5, wherein the alert is produced on the display.

8. The smartphone marine vessel location and collision avoidance system of claim 1, wherein the smartphone has a speaker and wherein the alert is produced by said speaker on the smartphone.

9. The smartphone marine vessel location and collision avoidance system of claim 1, wherein the smartphone communicates with a second navigational system located on the first marine vessel.

10. The smartphone marine vessel location and collision avoidance system of claim 9, wherein the second navigational system is a chartplotter.

11. The smartphone marine vessel location and collision avoidance system of claim 1, wherein the location of the second marine vessel is determined by a cellular communication.

12. The smartphone marine vessel location and collision avoidance system of claim 1, wherein the location of the second marine vessel is determined by a cellular communication with a cell tower.

13. The smartphone marine vessel location and collision avoidance system of claim 1, wherein the location of the second marine vessel is determined by signal transmission that passes to a satellite.

14. The smartphone marine vessel location and collision avoidance system of claim 1, wherein the location of the second marine vessel is determined through crowdsourcing.

15. The smartphone marine vessel location and collision avoidance system of claim 1, wherein the location of the second marine vessel is determined through carrier sourced location information.

16. The smartphone marine vessel location and collision avoidance system of claim 1, wherein the first smartphone comprises a location display of the second marine vessel; and wherein the size of the second marine vessel displayed on the first smartphone is correlated to the number of smartphones identified as being located on the second marine vessel.

17. The smartphone marine vessel location and collision avoidance system of claim 1, wherein the waring zone distance is enlarged when the number of smartphones identified as being located on the second marine vessel is above a first size threshold number.

18. The smartphone marine vessel location and collision avoidance system of claim 17, wherein the first threshold number is 10.

19. The smartphone marine vessel location and collision avoidance system of claim 1, wherein the smartphone has a chartplotter program and wherein the first smartphones comprises an application software (App) that determines the first marine vessel location and second marine vessel location and wherein the first marine vessel location and second marine vessel location are displayed on the first smartphone by the chartplotter program.

* * * * *